United States Patent
Iwabuchi

(10) Patent No.: US 10,829,618 B2
(45) Date of Patent: Nov. 10, 2020

(54) VINYL CHLORIDE RESIN COMPOSITION FOR POWDER MOLDING, AND VINYL CHLORIDE RESIN MOLDED BODY AND LAMINATE

(71) Applicant: ZEON CORPORATION, Tokyo (JP)

(72) Inventor: Satoshi Iwabuchi, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 14/911,763

(22) PCT Filed: Sep. 1, 2014

(86) PCT No.: PCT/JP2014/072884
§ 371 (c)(1),
(2) Date: Feb. 12, 2016

(87) PCT Pub. No.: WO2015/041031
PCT Pub. Date: Mar. 26, 2015

(65) Prior Publication Data
US 2016/0185941 A1    Jun. 30, 2016

(30) Foreign Application Priority Data
Sep. 18, 2013 (JP) ................................. 2013-192529

(51) Int. Cl.
| | | |
|---|---|---|
| *C08K 9/02* | (2006.01) | |
| *B29C 41/18* | (2006.01) | |
| *B32B 27/30* | (2006.01) | |
| *C08K 5/098* | (2006.01) | |
| *B32B 27/40* | (2006.01) | |
| *C08K 5/12* | (2006.01) | |
| *B32B 5/18* | (2006.01) | |
| *B32B 27/06* | (2006.01) | |
| *C08K 5/1515* | (2006.01) | |
| *B32B 27/18* | (2006.01) | |
| *B32B 27/22* | (2006.01) | |

(52) U.S. Cl.
CPC ............... *C08K 9/02* (2013.01); *B29C 41/18* (2013.01); *B32B 5/18* (2013.01); *B32B 27/065* (2013.01); *B32B 27/18* (2013.01); *B32B 27/22* (2013.01); *B32B 27/30* (2013.01); *B32B 27/304* (2013.01); *B32B 27/40* (2013.01); *C08K 5/098* (2013.01); *C08K 5/12* (2013.01); *C08K 5/1515* (2013.01); *B32B 2250/02* (2013.01); *B32B 2250/24* (2013.01); *B32B 2264/00* (2013.01); *B32B 2264/0242* (2013.01); *B32B 2264/102* (2013.01); *B32B 2264/104* (2013.01); *B32B 2264/12* (2013.01); *B32B 2266/0278* (2013.01); *B32B 2307/30* (2013.01); *B32B 2307/308* (2013.01); *B32B 2307/738* (2013.01); *B32B 2307/748* (2013.01); *B32B 2605/00* (2013.01); *B32B 2605/003* (2013.01); *B32B 2605/08* (2013.01)

(58) Field of Classification Search
CPC ..... B32B 27/065; B32B 27/304; B32B 27/22; B32B 5/18; B32B 2266/0278; B32B 2605/00

See application file for complete search history.

(56) References Cited

U.S. PATENT DOCUMENTS

| | | | |
|---|---|---|---|
| 4,861,816 A | 8/1989 | Kobayashi et al. | |
| 5,036,124 A | 7/1991 | Igarashi et al. | |
| 6,008,279 A * | 12/1999 | Shimizu ................... | C08J 3/005 524/298 |
| 2006/0052517 A1* | 3/2006 | Mitsudera ................ | C08K 5/10 524/567 |
| 2010/0272984 A1 | 10/2010 | Hada et al. | |
| 2013/0089728 A1* | 4/2013 | Kobayashi ............ | B32B 27/304 428/319.3 |

FOREIGN PATENT DOCUMENTS

| | | | | |
|---|---|---|---|---|
| EP | 0 246 867 A2 | 11/1987 | | |
| EP | 0668316 A2 * | 8/1995 | ............... | C08K 3/16 |
| EP | 0668316 A2 * | 8/1995 | ............... | C08K 3/16 |
| JP | 62-170645 A | 11/1987 | | |
| JP | 64-65157 A | 3/1989 | | |
| JP | 2-138355 A | 5/1990 | | |
| JP | 4-26303 A | 1/1992 | | |
| JP | 8-90697 A | 4/1996 | | |
| JP | 8-157672 A | 6/1996 | | |
| JP | 8-283499 A | 10/1996 | | |
| JP | 8-333496 A | 12/1996 | | |
| JP | 2007-216506 A | 8/2007 | | |
| WO | WO 2009/107463 A1 | 9/2009 | | |
| WO | WO-2012020618 A1 * | 2/2012 | ............... | C08K 5/12 |

OTHER PUBLICATIONS

Extended European Search Report, dated Sep. 26, 2016, for corresponding European Application No. 14845669.2.
International Preliminary Report on Patentability and English translation of the Written Opinion of the International Searching Authority (forms PCT/IB/373, PCT/ISA/237 and PCT/IB/338), dated Mar. 31, 2016, for International Application No. PCT/JP2014/072884.
International Search Report, dated Sep. 30, 2014, for International Application No. PCT/JP2014/072884,.
European Office Action, dated Sep. 13, 2018, for corresponding European Application No. 14 845 669.2.

* cited by examiner

*Primary Examiner* — Hai Vo
(74) *Attorney, Agent, or Firm* — Birch, Stewart, Kolasch & Birch, LLP

(57) ABSTRACT

A vinyl chloride resin composition for powder molding includes: 100 parts by mass of (a) vinyl chloride resin particles; 0.5 parts by mass to 7 parts by mass of (b) perchloric acid-treated hydrotalcite; and 0.05 parts by mass to 5 parts by mass of (c) metal salt of fatty acid.

6 Claims, No Drawings

VINYL CHLORIDE RESIN COMPOSITION FOR POWDER MOLDING, AND VINYL CHLORIDE RESIN MOLDED BODY AND LAMINATE

TECHNICAL FIELD

The present invention relates to (i) a vinyl chloride resin composition for powder molding, which is capable of providing a skin material which has a long-term thermal aging resistance even in a case where a polyurethane foam layer is stacked, (ii) a vinyl chloride resin molded article obtained by subjecting the vinyl chloride resin composition for powder molding to powder slush molding, and (iii) a laminate in which the vinyl chloride resin molded article and a polyurethane foam molded article are stacked.

BACKGROUND ART

An automobile instrument panel has a structure in which a polyurethane foam layer is provided between a skin made of vinyl chloride resin and a substrate. The skin made of vinyl chloride resin changes in color and deteriorates in thermal aging resistance over time. One of factors causing such a change in color and the like of the skin is a chemical reaction that occurs in association with a transfer of tertiary amine to the skin made of vinyl chloride resin, which tertiary amine has been used as a catalyst during formation of the polyurethane foam layer. In order to prevent the change in color of the skin, studies were made as to an urethane-integrated foaming molded article in which a particulate catching agent for capturing a volatile organic compound generated in the polyurethane foam layer is (i) covered with a sheet having continuous air bubbles and (ii) provided in the vicinity of a part of an end of the polyurethane foam layer at which part the end of the polyurethane foam layer is sealed with the skin material and the substrate (see, for example, Patent Literature 1). However, the urethane-integrated foaming molded article has a part where the skin is in contact with the polyurethane foam layer. This makes it impossible to prevent, for a long period of time, the change in color of the skin material which change is caused by the chemical reaction, thereby deteriorating the thermal aging resistance of the skin material.

Further, studies were made as to a laminate in which (i) a foaming layer made of synthetic resin is provided so as to join a core material and a skin and (ii) holes, from which gas generated in the foaming layer is to be discharged, are formed in the core material (see, for example, Patent Literature 2). However, the laminate has a part where the skin is in contact with the foaming layer. This makes it impossible to prevent, for a long period of time, a change in color of the skin material which change is caused by the chemical reaction, thereby deteriorating thermal aging resistance of the skin material.

Furthermore, studies were made as to a molded article made up of (i) a polyurethane molded article, (ii) a skin layer which contains vinyl chloride resin and covers at least a part of a surface of the polyurethane molded article, and (iii) a layer of an amine catching agent sandwiched between the polyurethane molded article and the skin layer (see, for example, Patent Literature 3). However, the amine catching agent easily volatilizes, and it is impossible to prevent, for a long period of time, a transfer of tertiary amine to the skin layer made of the vinyl chloride resin. This makes it impossible to prevent, for a long period of time, a change in color of the skin layer which change is caused by the chemical reaction, thereby deteriorating thermal aging resistance of the skin layer.

Moreover, a vinyl chloride resin composition for powder molding, in which a specific trimellitate plasticizer is mixed, was studied as a raw material for a skin material of an automobile interior material (see, for example, Patent Literature 4). In order to improve thermal aging resistance of the skin material obtained by powder molding of the vinyl chloride resin composition for powder molding, it is necessary to increase an amount of the trimellitate plasticizer mixed. Such increase in the amount of the trimellitate plasticizer mixed causes stickiness due to the trimellitate plasticizer. Furthermore, studies were made as to a vinyl chloride resin composition for powder molding which contains (i) 100 parts by mass of vinyl chloride resin particles made of vinyl chlorine resin having an average polymerization degree of not less than 1500 and (ii) 110 parts by mass to 150 parts by mass of a specific trimellitate plasticizer (for example, see Patent Literature 5).

CITATION LIST

Patent Literature

Patent Literature 1
Japanese Patent Application Publication, Tokukai, No. 2007-216506
Patent Literature 2
Japanese Patent Application Publication, Tokukaihei, No. 8-90697 (1996)
Patent Literature 3
Japanese Examined Patent Application Publication, Tokukouhei, No. 4-26303 (1992)
Patent Literature 4
Japanese Patent Application Publication, Tokukaihei, No. 2-138355 (1990)
Patent Literature 5
International Publication No. WO 2009/107463

SUMMARY OF INVENTION

Technical Problem

Recently, an automobile instrument panel skin, in which a polyurethane foam layer is stacked, has been required to have an improved thermal aging resistance. However, an automobile instrument panel having a skin that sufficiently meets such requirements has not been realized.

An object of the present invention is to provide a vinyl chloride resin composition for powder molding, which is capable of providing a molded article that has an excellent thermal aging resistance even in a case where a polyurethane foam layer is stacked. Another object of the present invention is to provide (i) a vinyl chloride resin molded article which is obtained by subjecting the vinyl chloride resin composition for powder molding to powder slush molding and has an excellent thermal aging resistance even in a case where a polyurethane foam layer is stacked on this vinyl chloride resin molded article, and (ii) a laminate in which the vinyl chloride resin molded article and a polyurethane foam molded article are stacked.

Solution to Problem

In order to attain the objects, the inventor of the present invention diligently studied, and as a result, found that a skin material having a particularly excellent thermal aging resistance can be given by a vinyl chloride resin composition for powder molding that includes (a) vinyl chloride resin particles, a specific amount of (b) perchloric acid-treated hydrotalcite, and a specific amount of (c) metal salt of fatty acid. As a result, the inventor has completed the present invention.

The present invention is directed to a vinyl chloride resin composition for powder molding, including: 100 parts by mass of (a) vinyl chloride resin particles; 0.5 parts by mass to 7 parts by mass of (b) perchloric acid-treated hydrotalcite; and 0.05 parts by mass to 5 parts by mass of (c) metal salt of fatty acid.

Moreover, the present invention is a vinyl chloride resin molded article obtained by subjecting, to powder slush molding, the vinyl chloride resin composition for powder molding.

Furthermore, the present invention is a laminate in which a polyurethane foam molded article and the vinyl chloride resin molded article are stacked.

Advantageous Effects of Invention

A vinyl chloride resin composition of the present invention for powder molding provides a skin material having a long-term thermal aging resistance even in a case where the vinyl chloride resin composition is laminated with a polyurethane foam layer.

DESCRIPTION OF EMBODIMENTS

A vinyl chloride resin composition of the present invention for powder molding contains (a) vinyl chloride resin particles (hereinafter, also referred to simply as "(a) vinyl chloride resin particles"). A vinyl chloride resin constituting (a) the vinyl chloride resin particles includes not only a homopolymer of vinyl chloride but also a copolymer that contains preferably not less than 50 percent by mass of vinyl chloride unit, or more preferably not less than 70 percent by mass of vinyl chloride unit. Specific examples of comonomers of such a vinyl chloride copolymer include: olefins such as ethylene and propylene; olefin halides such as allyl chloride, vinylidene chloride, vinyl fluoride, and ethylene chloride trifluoride; carboxylic acid vinyl esters such as vinyl acetate and vinyl propionate; vinyl ethers such as isobutyl vinyl ether and cetyl vinyl ether; allyl ethers such as allyl-3-chloro-2-oxypropyl ether and allyl glycidyl ether; unsaturated carboxylic acids, esters thereof, and acid anhydrides thereof such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylic amides such as acrylic amide, N-methylol acrylic amide, acrylic amide-2-methyl propane sulfonic acid, and (meth)acrylamide propyltrimethyl ammonium chloride; allylamines and derivatives thereof such as allylamine benzoate and diallyl dimethyl ammonium chloride; and the like. The above monomers are only parts of monomers capable of copolymerizing with vinyl chloride, and monomers shown on pages 75 to 104 of "Polyvinyl Chloride" (edited by THE KINKI CHEMICAL SOCIETY JAPAN, published by Nikkan Kogyo Shinbun Ltd., (1988)) can be used as the monomers capable of copolymerizing with vinyl chloride. One or a combination of two or more of the monomers can be used. The vinyl chloride resin constituting (a) the vinyl chloride resin particles includes resin obtained by graft-polymerizing resin such as an ethylene-vinyl acetate copolymer, an ethylene-methyl methacrylate copolymer, an ethylene-ethyl acrylate copolymer, or chlorinated polyethylene with (1) vinyl chloride or (2) vinyl chloride and any of the copolymerizable monomers described above.

The vinyl chloride resin constituting (a) the vinyl chloride resin particles can be produced by any of well-known methods such as a suspension polymerization method, an emulsion polymerization method, a solution polymerization method, and a mass polymerization method. Especially, vinyl chloride resin produced by the suspension polymerization method is preferable.

The vinyl chloride resin constituting (a) the vinyl chloride resin particles has an average polymerization degree of preferably 800 to 5000, and more preferably 800 to 3000. When the vinyl chloride resin constituting (a) the vinyl chloride resin particles has the average polymerization degree in the above ranges, an excellent thermal aging resistance can be given to a vinyl chloride resin molded article that is obtained by subjecting the vinyl chloride resin composition for powder molding to powder slush molding. Note that the average polymerization degree is measured in conformity to JIS K 6720-2.

An average particle size of (a) the vinyl chloride resin particles is not especially limited. The average particle size ranges from preferably 50 μm to 5.00 μm, more preferably from 50 μm to 250 μm, and most preferably from 100 μm to 200 μm. When the average particle, size of (a) the vinyl chloride resin particles falls within the above ranges, powder flowability of the vinyl chloride resin composition for powder molding is excellent, and smoothness of the vinyl chloride resin molded body is improved which vinyl chloride resin molded body is obtained by subjecting the vinyl chloride resin composition for powder molding to powder slush molding. Note that the average particle size of (a) the vinyl chloride resin is measured by classification by use of a JIS standard sieve defined by JIS Z 8801.

A vinyl chloride resin composition of the present invention for powder molding includes (b) perchloric acid-treated hydrotalcite. (b) The perchloric acid-treated hydrotalcite is produced easily, for example, in the following process: A hydrotalcite is mixed with a dilute aqueous solution of perchloric acid, and the mixture is then stirred. Thereafter, the mixture is filtered, dehydrated, or dried as appropriate, so that at least a part of anion carbonate ($CO_3^{2-}$) in the hydrotalcite is substituted with anion perchlorate ($ClO_4^-$) (1 mol of anion carbonate is substituted with 2 mol of anion perchlorate). A mol ratio of the hydrotalcite and the perchloric acid can be set to any ratio. However, generally, 0.1 to 2 mol of perchloric acid is used per mol of hydrotalcite.

A substitution ratio of an anion perchlorate with which an anion carbonate in an untreated hydrotalcite (yet to be subjected to substitution) is substituted is preferably 50 mol % or more, more preferably 70 mol % or more, and still more preferably 85 mol % or more. Further, the substitution ratio of an anion perchlorate with which an anion carbonate in an untreated hydrotalcite (yet to be subjected to substitution) is substituted is preferably 95 mol % or less. In a case where the ratio of substitution of an anion carbonate in an untreated hydrotalcite (yet to be subjected to substitution) with an anion perchlorate falls within the above ranges, an excellent thermal aging resistance and a particularly excellent tensile elongation at break after being heated can be given to a vinyl chloride resin molded article that is obtained by subjecting the vinyl chloride resin composition for powder molding to powder slush molding.

The hydrotalcite is a non-stoichiometric compound represented by general formula $[Mg_{1-x}Al_x(OH)_2]^{x+}[(CO_3)_{x/2}.mH_2O]^{x-}$. The hydrotalcite is an inorganic substance having a layered crystalline structure in which a positively charged basic layer represented by $[Mg_{1-x}Al_x(OH)_2]^{x+}$ and a negatively charged intermediate layer represented by $[(CO_3)_{x/2}.mH_2O]^{x-}$ are stacked. Note here that x is more than 0 and not more than 0.33. Natural hydrotalcite is represented by $Mg_6Al_2(OH)_{16}CO_3.4H_2O$. Synthesized hydrotalcite is represented by $Mg_{4.5}Al_2(OH)_{13}CO_3.3.5H_2O$, which is commercially available. A method of synthesizing the synthesized hydrotalcite is described in Japanese Examined Patent Application Publication, Tokukousho, No. 61-174270.

A content of (b) perchloric acid-treated hydrotalcite ranges from 0.5 parts by mass to 7 parts by mass, preferably from 1 part by mass to 5 parts by mass, and more preferably from 1.5 parts by mass to 4 parts by mass, with respect to 100 parts by mass of (a) vinyl chloride resin particles. In a case where the content of (b) perchloric acid-treated hydrotalcite is in the above ranges, excellent thermal aging resistance, maximum tensile strength, and tensile elongations at break can be given to a vinyl chloride resin molded article that is obtained by subjecting the vinyl chloride resin composition for powder molding to powder slush molding.

A vinyl chloride resin composition of the present invention for powder molding contains (c) metal salt of fatty acid. The (c) metal salt of fatty acid is preferably a monovalent metal salt of fatty acid, more preferably a monovalent metal salt of fatty acid having 12 to 24 carbons, and still more preferably a monovalent metal salt of fatty acid having 15 to 21 carbons. Specific examples of (c) metal salt of fatty acid include lithium stearate, magnesium stearate, aluminum stearate, calcium stearate, strontium stearate, barium stearate, zinc stearate, calcium laurate, barium laurate, zinc laurate, barium 2-ethyl hexanoate, zinc 2-ethyl hexanoate, barium ricinoleate, zinc ricinoleate, and the like. A metal constituting (c) metal salt of fatty acid is preferably a metal which can generate a polyvalent cation, more preferably a metal which can generate a divalent cation, still more preferably a metal which (i) belongs to any of the third to sixth periods of the periodic table and (ii) can generate a divalent cation, and particularly preferably a metal which (i) belongs to the fourth period of the periodic table and (ii) can generate a divalent cation. (c) metal salt of fatty acid is the most preferably zinc stearate.

A content of (c) metal salt of fatty acid ranges from 0.05 parts by mass to 5 parts by mass, preferably ranges from 0.1 part by mass to 1 part by mass, and more preferably ranges from 0.1 part by mass to 0.5 parts by mass, with respect to 100 parts by mass of (a) vinyl chloride resin particles. In a case where the content of (c) metal salt of fatty acid is in the above ranges, excellent thermal aging resistance, maximum tensile strength, and tensile elongations at break can be given to a vinyl chloride resin molded article that is obtained by subjecting the vinyl chloride resin composition for powder molding to powder slush molding. In addition, it is possible to decrease a color-difference value.

The vinyl chloride resin composition of the present invention for powder molding can contain (d) a plasticizer. Specific examples of (d) the plasticizer include so-called primary plasticizers such as: trimellitate plasticizers such as trimellitic acid tri-n-hexyl, trimellitic acid tri-n-heptyl, trimellitic acid tri-n-octyl, trimellitic acid tri-(2-ethylhexyl), trimellitic acid tri-n-nonyl, trimellitic acid tri-n-decyl, trimellitic acid triisodecyl, trimellitic acid tri-n-undecyl, trimellitic acid tri-n-dodecyl, and trimellitic acid tri-n-alkyl (containing C6 to C12 alkyl group) ester; pyromellitate plasticizers such as pyromellitic acid tetra-n-hexyl, pyromellitic acid tetra-n-heptyl, pyromellitic acid tetra-n-octyl, pyromellitic acid tetra-(2-ethylhexyl), pyromellitic acid tetra-n-nonyl, pyromellitic acid tetra-n-decyl, pyromellitic acid tetra-isodecyl, pyromellitic acid tetra-n-undecyl, pyromellitic acid tetra-n-dodecyl, and pyromellitic acid tetra-n-alkyl (containing C6 to C12 alkyl group) ester; epoxidized plant oils such as epoxidized soybean oil and epoxidized flax seed oil; phthalic acid derivatives such as dimethyl phthalate, diethyl phthalate, di-n-butyl phthalate, diisobutyl phthalate, di-n-heptyl phthalate, di-(2-ethylhexyl) phthalate, di-n-octyl phthalate, di-n-nonyl phthalate, di-n-decyl phthalate, diisodecyl phthalate, di-n-undecyl phthalate, di-n-dodecyl phthalate, di-n-tridecyl phthalate, dicyclohexyl phthalate, diphenyl phthalate, dibenzyl phthalate, and n-butyl benzyl phthalate; isophthalic acid derivatives such as dimethyl isophthalate, di-(2-ethylhexyl) isophthalate, and diisooctyl isophathalate; tetrahydro phthalic acid derivatives such as di-(2-ethylhexyl)tetrahydro phthalate, di-n-octyl tetrahydro phthalate, and diisodecyl tetrahydro phthalate; adipic acid derivatives such as di-n-butyl adipate, di(2-ethylhexyl)adipate, diisononyl adipate, and diisodecyl adipate; azelaic acid derivatives such as di-n-hexyl azelate, di-(2-ethylhexyl)azelate, and diisooctyl azelate; sebacic acid derivatives such as di-n-butyl sebacate, di-(2-ethylhexyl)sebacate, diisodecyl sebacate, and di-(2-butyloctyl)sebacate; maleic acid derivatives such as dimethyl maleate, diethyl maleate, di-n-butyl maleate, and di-(2-ethylhexyl)maleate; fumaric acid derivatives such as di-n-butyl fumarate, and di-(2-ethylhexyl)fumarate; citric acid derivatives such as triethyl citrate, tri-n-butyl citrate, acetyl triethyl citrate, and acetyl tri-(2-ethylhexyl)citrate; itaconic acid derivatives such as monometyl itaconate, mono-n-butyl itaconate, dimethyl itaconate, diethyl itaconate, di-n-butyl itaconate, and di-(2-ethylhexyl)itaconate; oleic acid derivatives such as n-butyl oleate, glyceryl monooleate, and diethylene glycol monooleate; ricinoleic acid derivatives such as methyl acetyl ricinoleate, n-butyl acetyl ricinoleate, glyceryl monoricinoleate, and diethylene glycol monoricinoleate; stearic acid derivatives such as n-butyl stearate and diethylene glycol distearate; other fatty acid derivatives such as diethylene glycol monolaurate, diethylene glycol dipelargonate, and pentaerythritol fatty acid ester; phospholic acid derivatives such as triethyl phosphate, tri-n-butyl phosphate, tri-(2-ethylhexyl)phosphate, tri-n-butoxyethyl phosphate, triphenyl phosphate, cresyl diphenyl phosphate, tricresyl phosphate, trixylenyl phosphate, and tris(chloroethyl)phosphate; glycol derivatives such as diethylene glycol dibenzoate, dipropyrene glycol dibenzoate, triethylene glycol dibenzoate, triethylene glycol di-(2-ethylbutylate), triethylene glycol di-(2-ethylhexoate), and dibutyl methylene bisthioglycolate; glycerin derivatives such as glycerol monoacetate, glycerol triacetate, and glycerol tributylate; epoxy derivatives such as epoxy hexahydro diisodecyl phthalate, epoxy triglyceride, epoxidized octyl oleate, and epoxidized decyl oleate; and polyester plasticizers including polyester adipate, polyester sebacate, and polyester phthalate, so-called secondary plasticizers such as chlorinated paraffin, fatty acid ester of glycol (such as triethylene glycol dicaprylate), n-butyl epoxy stearate, phenyl oleate, and dihydro methyl abietate, and the like.

One or a combination of two or more of plasticizers can be used. In a case where the secondary plasticizer is used, it is preferable to use in combination the primary plasticizer in a mass equal to or larger than that of the secondary plasticizer.

Preferably, (d) the plasticizer is any of the trimellitate plasticizers, any of the pyromellitate plasticizers, and any of the epoxidized plant oils. More preferably, (d) the plasticizer is any of the trimellitate plasticizers and any of the epoxidized plant oils.

The trimellite plasticizer is preferably an ester compound of trimellitic acid and monoalcohol.

More preferably, the trimellitate plasticizer is, for example, a compound represented by the following formula (1).

[Chem. 1]

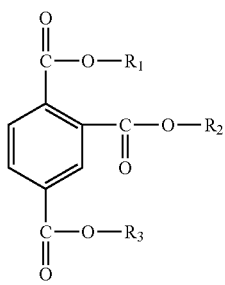

(1)

where: $R_1$ through $R_3$ represent an alkyl group and may be identical with each other or different from each other; a linear chain ratio of $R_1$ through $R_3$ is 90 mol % or more, and preferably 95 mol % or more; a ratio of an alkyl group having 7 carbons or less to all alkyl groups of $R_1$ through $R_3$ ranges from 0 mol % to 10 mol %; a ratio of an alkyl group having 8 or 9 carbons to the all alkyl groups of $R_1$ through $R_3$ ranges from 5 mol % to 100 mol %, preferably 40 mol % to 95 mol %, and more preferably 75 mol % to 95 mol %; a ratio of an alkyl group having 10 carbons to the all alkyl groups of $R_1$ through $R_3$ ranges from 0 mol % to 95 mol %, preferably 5 mol % to 60 mol %, and more preferably 5 mol % to 25 mol %; and a ratio of an alkyl group having 11 or more carbons to the all alkyl groups of $R_1$ through $R_3$ ranges from 0 mol % to 10 mol %; and the linear chain ratio of $R_1$ through $R_3$ is a ratio of a linear chain alkyl group to the all alkyl groups of $R_1$ through $R_3$.

Specific examples of the linear chain alkyl group include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-hexadecyl group, an n-pentadecyl group, an n-hexadecyl group, an n-heptadecyl group, an n-stearyl group, and the like. Specific examples of a branched alkyl group include an i-propyl group, an i-butyl group, an i-pentyl group, an i-hexyl group, an i-heptyl group, an i-octyl group, an i-nonyl group, an i-decyl group, an i-undecyl group, an i-dodecyl group, an i-tridecyl group, an i-hexadecyl group, an i-pentadecyl group, an hexadecyl group, an i-heptadecyl group, an i-octadecyl group, a t-butyl group, a t-pentyl group, a t-hexyl group, a t-heptyl group, a t-octyl group, a t-nonyl group, a t-decyl group, a t-undecyl group, a t-dodecyl group, a t-tridecyl group, a t-hexadecyl group, a t-pentadecyl group, a t-hexadecyl group, a t-heptadecyl group, a t-octadecyl group, a 2-ethylhexyl group, and the like.

The trimellitate plasticizer may be a single compound or may be a mixture of plural components. In general, commercially available trimellitate plasticizers are mixtures. Among such commercially-available mixtures, a mixture which meets the above requirements is preferably selected. A specific example of the commercially-available trimellitate plasticizers is TRIMEX N-08 produced by Kao Corporation.

In particular, among the epoxidized plant oils, epoxidized soybean oil is preferable.

A content of (d) the plasticizer preferably ranges from 70 parts by mass to 200 parts by mass, more preferably ranges from 80 parts by mass to 150 parts by mass, and still more preferably ranges from 90 parts by mass to 120 parts by mass with respect to 100 parts by mass of (a) the vinyl chloride resin particles. In a case where the content of (d) the plasticizer is in the above ranges, an excellent thermal aging resistance can be given to a vinyl chloride resin molded article that is obtained by subjecting the vinyl chloride resin composition for powder molding to powder slush molding.

As (d) the plasticizer, the trimellitate plasticizer and any of the epoxidized plant oils are preferably used in combination. In this case, a weight ratio of the trimellitate plasticizer and any of the epoxidized plant oils preferably ranges from 15:1 to 25:1.

The vinyl chloride resin composition of the present invention for powder molding may contain zeolite as a stabilizer. The zeolite is represented by general formula:

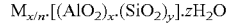

$M_{x/n} \cdot [(AlO_2)_x \cdot (SiO_2)_y] \cdot zH_2O$ where M represents a metal ion having a valence of n, x+y represents the number of tetrahedrons per unit lattice, and z represents the number of moles of water. Specific examples of M in the above general formula include (i) monovalent or divalent metal ions of sodium, lithium, calcium, magnesium, zinc or the like and (ii) a combination of these metal ions.

A content of the zeolite is not limited to a specific range. It is, however, preferable that the content of the zeolite is in a range of 0.1 part by mass to 5 parts by mass with respect to 100 parts by mass of (a) the vinyl chloride resin particles.

The vinyl chloride resin composition of the present invention for powder molding may contain a dusting agent (powder flowability reforming agent). Specific examples of the dusting agent include: inorganic fine particles of calcium carbonate, talc, aluminum oxide and the like; and organic fine particles such as vinyl chloride resin fine particles, polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. In particular, inorganic fine particles whose average particle size ranges from 10 nm to 100 nm, and vinyl chloride resin fine particles whose average particle size ranges from 0.1 μM to 10 μm are preferable. A polymerization degree of vinyl chloride resin which constitutes the vinyl chloride resin fine particles serving as the dusting agent preferably ranges from 500 to 2000, and more preferably from 700 to 1500. A content of the vinyl chloride resin fine particles serving as the dusting agent is not limited to a specific range. However, the content of the vinyl chloride resin particles is preferably not more than 30 parts by mass, and more preferably not less than 10 parts by mass and not more than 25 parts by mass, with respect to 100 parts by mass of (a) the vinyl chloride resin particles.

The vinyl chloride resin composition of the present invention for powder molding may contain other additives such as a coloring agent, an impact resistance reforming agent, a perchloric acid compound except a perchloric acid-treated hydrotalcite (e.g. sodium perchlorate, potassium perchlorate), an oxidization inhibitor, an antifungal agent, a flame retardant, an antistatic agent, a filler, an ultraviolet absorber, a light stabilizer, a foaming agent, and a β-diketone.

Specific examples of the coloring agent include quinacridone pigment, perylene pigment, polyazo condensation pigment, isoindolinon pigment, copper phthalocyanine pigment, titanium white, and carbon black. One or a combination of two or more of the pigments is/are used as the coloring agent. The quinacridone pigment is obtained by treating p-phenylene dianthranilates with concentrated sulfuric acid, and shows yellowish red to reddish purple. Specific examples of the quinacridone pigment include quinacridon red, quinacridon magenta, and quinacridon violet. The perylene pigment is obtained by condensation reaction of perylene-3,4,9,10-tetracarbolic acid anhydride with aromatic primary amine, and shows red to reddish purple and brown. Specific examples of the perylene pigment include perylene red, perylene orange, perylene maroon, perylene vermilion, and perylene bordeaux. The polyazo condensation pigment is obtained by condensing azo pigment in a solvent to have high molecular weight, and shows yellow or red. Specific examples of the polyazo condensation pigment include polyazo red, polyazo yellow, chromophthal orange, chromophthal red, and chromophthal scarlet. The isoindolinon pigment is obtained by condensation reaction of 4,5,6,7-tetrachloroisoindolinon with aromatic primary diamine, and shows greenish yellow to red and brown. A specific example of the isoindolinon pigment is isoindolinon yellow. The copper phthalocyanine pigment is a pigment in which copper is coordinated to phthalocyanines, and shows yellowish green to vivid blue. Specific examples of the copper phthalocyanine pigment include phthalocyanine green, and phthalocyanine blue. The titanium white is a white pigment made from titanium dioxide, has a great hiding power, and is of anatase-type or rutile-type. The carbon black mainly contains carbon, and is a black pigment containing oxygen, hydrogen, and nitrogen. Specific examples of the carbon black include thermal black, acetylene black, channel black, furnace black, lamp black, and bone black.

Specific examples of the impact resistance reforming agent include acrylonitrile-butadiene-styrene copolymer, methyl methacrylate-butadiene-styrene copolymer, chlorinated polyethylene, ethylene-vinyl acetate copolymer, chlorosulfonated polyethylene, and the like. One or a combination of two or more of the impact resistance reforming agents can be used. The impact resistance reforming agent becomes non-uniformly dispersed elastic fine particles in a vinyl chloride resin composition for powder molding. A chain and a polar group which are graft-polymerized with the elastic fine particles are dissolved with (a) the vinyl chloride resin particles, thereby improving impact resistance of the vinyl chloride resin composition for powder molding.

Specific examples of the oxidization inhibitor include a phenolic oxidization inhibitor, a sulfur oxidization inhibitor, a phosphorous oxidization inhibitor, and the like.

Specific examples of the antifungal agent include an aliphatic ester antifungal agent, a hydrocarbon antifungal agent, an organic nitrogen antifungal agent, an organic nitrogen sulfur antifungal agent, and the like.

Specific examples of the flame retardant include a halogen flame retardant such as chlorinated paraffin, a phosphorous flame retardant such as phosphate ester, inorganic hydroxides such as magnesium hydroxide and aluminum hydroxide, and the like.

Specific examples of the antistatic agent include: anionic antistatic agents such as fatty acid salts, higher alcohol sulfate esters, and sulfonates; cationic antistatic agents such as aliphatic amine salts, and quaternary ammonium salts; nonionic antistatic agents such as polyoxyethylenealkylethers, and polyoxyethylene alkylphenolethers; and the like.

Specific examples of the filler include silica, talc, mica, calcium carbonate, clay, and the like.

Specific examples of the light stabilizer include ultraviolet absorbers of benzotriazol, benzophenone, nickel chelate, etc., a hindered amine light stabilizer, and the like.

Specific examples of the foaming agent include: organic foaming agents such as azo compounds (e.g. azodicarbonamide, azobisisobutyronitrile), nitroso compounds (e.g. N,N'-dinitroso pentamethylene tetramine), sulfonylhydrazide compounds (e.g. p-toluenesulfonylhydrazide, p,p-oxybis (benzenesulfonylhydrazide); gaseous foaming agents such as CFC gas, carbon dioxide gas, water, a volatile hydrocarbon compound (e.g. pentane), and microcapsules including the gaseous foaming agents; and the like.

The β-diketone is used to more effectively prevent change in initial color of a vinyl chloride resin molded article obtained by powder molding the vinyl chloride resin composition of the present invention for powder molding. Specific examples of the β-diketone include dibenzoylmethane, stearoylbenzoylmethane, palmitoylbenzoylmethane, and the like. One or a combination of two or more of the β-diketones may be used.

A content of the β-diketone is not limited to a specific range. It is, however, preferable that the content of the β-diketone be in a range of 0.1 part by mass to 5 parts by mass with respect to 100 parts by mass of (a) the vinyl chloride resin particles.

A method for mixing (a) the vinyl chloride resin particles, (b) the perchloric acid-treated hydrotalcite, (c) the metal salt of fatty acid, and the other additives to be added if necessary, is not limited. It is, however, preferable that the method be a method of mixing, by dry blending, the components except the plasticizers and the dusting agent, and thereafter sequentially mixing the plasticizers and the dusting agent into the mixture. Further, it is preferable to use a Henschel mixer for the dry blending. Furthermore, during the dry blending, temperature is preferably in a range of 50° C. to 100° C., and more preferably in a range of 70° C. to 80° C.

The vinyl chloride resin molded article of the present invention is obtained by subjecting the vinyl chloride resin composition of the present invention for powder molding to powder slush molding. During the powder slush molding, temperature of a mold is preferably in a range of 200° C. to 300° C., and more preferably in a range of 220° C. to 280° C. The vinyl chloride resin molded article of the present invention is suitably obtainable as below. First, the vinyl chloride resin composition of the present invention for powder molding is sprinkled on the mold having the temperature that falls within the ranges, and let stand for 5 seconds to 30 seconds. Thereafter, surplus of the vinyl chloride resin composition is shaken off from the mold, and then the resultant vinyl chloride resin composition in the mold is let stand for 30 seconds to 3 minutes. Thereafter, the mold is cooled down to 10° C. to 60° C., and then the vinyl chloride resin molded article of the present invention is removed from the mold. The vinyl chloride resin molded article of the present invention is suitably applicable to skins of automobile interior materials such as an instrument panel and a door trim.

A laminate of the present invention is obtained by stacking the vinyl chloride resin molded article of the present invention and a polyurethane foam molded article. Examples of the method include (i) a first method in which the vinyl chloride resin molded article and the polyurethane foam molded article are bonded by means of thermal fusion or thermal bonding or by use of a conventionally well-known adhesive, after the vinyl chloride resin molded article and the polyurethane foam molded article have been separately produced and (ii) a second method in which polyurethane is foamed on the vinyl chloride resin molded article by a conventionally well-known method while an isocyanate and a polyol, for example, as raw materials for the polyurethane foam molded article are being polymerized on the vinyl chloride resin molded article. The second method is simpler, and more preferable than the first method because the second method can surely bond the vinyl chloride resin molded article and the polyurethane foam molded article to each other to form various shapes of the laminate.

The laminate of the present invention is suitably applicable to automobile interior materials such as an instrument panel and a door trim.

As described above, the vinyl chloride resin composition of the present invention for powder molding preferably further includes 70 parts by mass to 200 parts by mass of (d) plasticizer with respect to 100 parts by mass of (a) the vinyl chloride resin particles. Further, the (d) plasticizer is more preferably at least one selected from the group consisting of trimellitate plasticizers and epoxidized plant oils. The perchloric acid-treated hydrotalcite contains an anion perchlorate with which an anion carbonate is substituted preferably in a ratio of 50 mol % or more. The vinyl chloride resin composition of the present invention for powder molding is preferably for use in powder slush molding. The vinyl chloride resin molded article of the present invention is preferably for use as an automobile instrument panel skin. The laminate is preferably a laminate for use in an automobile instrument panel.

EXAMPLES

The following details the present invention by referring to Examples. Note, however, that the present invention is not limited to these Examples.

Production of Perchloric Acid-Treated Hydrotalcites

DHT-4A (untreated hydrotalcites) manufactured by Kyowa Chemical Industry Co., Ltd. were used as hydrotalcites. The untreated hydrotalcites were treated with perchloric acids by mixing the untreated hydrotalcites with respective dilute aqueous solutions of perchloric acid, stirring the mixtures, and then filtering, dehydrating, and drying the resulting mixtures. As a result, a perchloric acid-treated hydrotalcite in which 90 mol % of anion carbonate was substituted with an anion perchlorate, a perchloric acid-treated hydrotalcite in which 80 mol % of anion carbonate was substituted with an anion perchlorate, and a perchloric acid-treated hydrotalcite in which 60 mol % of anion carbonate was substituted with an anion perchlorate were obtained.

Examples 1 Through 6 and Comparative Examples 1 Through 3

Components shown in Table 1, except plasticizers and a dusting agent, were mixed in a Henschel mixer. When temperature of a mixture thus obtained was increased to 80° C., the plasticizers were added into the Henschel mixer to attain a dry-up (indicating a state where the plasticizers added are absorbed by vinyl chloride resin particles, so that the mixture becomes smooth and dry) composition. Thereafter, when a resultant composition was cooled down to 70° C. or less, vinyl chloride resin fine particles in paste form serving as the dusting agent were added to the composition to prepare a vinyl chloride resin composition for powder molding. The vinyl chloride resin composition for powder molding was sprinkled on a textured mold heated up to 250° C. Then, after the vinyl chloride resin composition was left for 13 seconds to fuse, surplus of the vinyl chloride resin composition was shaken down. At the time when 60 seconds elapsed after the sprinkling of the composition, the mold was cooled down by cooling water. When the mold was cooled down to 40° C., a molded vinyl chloride resin sheet of 205 mm×298 mm×1 mm was released from the mold. A resin sheet was laid in a mold of 210 mm×300 mm×10 mm, and a mixture of 40 parts by mass of 4,4'-diphenylmethane diisocyanate and 80 parts by mass of polyether polyol (EXCENOL 820, produced by Asahi Glass Urethane Co., Ltd., having 3 functionalities and hydroxyl value of 34 mgKOH/g and containing 1.0 percent by mass of triethylene diamine and 1.6 percent by mass of water) was poured onto the molded vinyl chloride resin sheet, and the mold was sealed by use of an aluminum plate of 305 mm×395 mm×2 mm. After 5 minutes, a sample was taken out of the mold. In this sample, a 1-mm-thick skin made of the molded vinyl chloride resin sheet was lined by a 9-mm-thick polyurethane foam molded article having a density of 0.2 g/cm³. A polyurethane foam layer was removed from the sample. Then, the resultant molded vinyl chloride resin sheet was punched through by use of a No. 1 dumbbell. Maximum tensile strength and tensile elongations at break of the molded vinyl chloride resin sheet thus punched were measured in conformity to JIS-K-6301 at temperature of −20° C. Further, the sample lined by the polyurethane foam molded article was put in an oven and heated up to 130° C. for 100 hours or 250 hours, and a polyurethane foam layer was then removed from the sample. The maximum tensile strength and the tensile elongations at break of the sample were measured in the same manner. After the sample lined by the polyurethane foam molded article was put in an oven and heated up to 130° C. for 100 hours, a polyurethane foam layer was removed from the sample. Then, color difference ΔE* of the sample before and after heating was measured by a chroma meter (CR-400 produced by Konica Minolta Sensing, Inc. The smaller the color difference value is, the higher the discoloration resistance to high temperature is. Results are shown in Table 1.

TABLE 1

| | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Mixture composition part(s) by mass | Vinyl chloride resin [1] | 100.0 | 100.0 | 100.0 | 100.0 | 100.0 | 100.0 | 100.0 | 100.0 | 100.0 |
| | 90% perchloric acid-treated hydrotalcite [2] | 1.0 | 2.0 | 3.5 | 5.0 | — | — | — | 3.5 | 3.0 |
| | 80% perchloric acid-treated hydrotalcite [3] | — | — | — | — | 3.5 | — | — | — | — |
| | 60% perchloric acid-treated hydrotalcite [4] | — | — | — | — | — | 3.5 | — | — | — |

TABLE 1-continued

|  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
|  | Untreated hydrotakite [5] | — | — | — | — | — | — | 3.5 | — | — |
|  | Zinc stearate [6] | 0.2 | 0.2 | 0.2 | 0.2 | 0.2 | 0.2 | 0.2 | — | 0.2 |
|  | Plasticizer A (trimellitate) [7] | 98.0 | 98.0 | 98.0 | 98.0 | 98.0 | 98.0 | 98.0 | 98.0 | 98.0 |
|  | Plasticizer B (epoxidized soybean oil) [8] | 5.0 | 5.0 | 5.0 | 5.0 | 5.0 | 5.0 | 5.0 | 5.0 | 5.0 |
|  | Zeolite [9] | 2.0 | 2.0 | 2.0 | 2.0 | 2.0 | 6.0 | 2.0 | 2.0 | 2.0 |
|  | Stearcylbenzoylmethane (β-diketone) [10] | 0.4 | 0.4 | 0.4 | 0.4 | 0.4 | 0.4 | 0.4 | 0.4 | 0.4 |
|  | Phosphite stabilizer [11] | 0.6 | 0.6 | 0.6 | 0.6 | 0.6 | 0.6 | 0.6 | 0.8 | 0.6 |
|  | Dusting agent [12] | 18.0 | 18.0 | 18.0 | 18.0 | 18.0 | 18.0 | 18.0 | 18.0 | 18.0 |
|  | Pigment [13] | 3.0 | 3.0 | 3.0 | 3.0 | 3.0 | 3.0 | 3.0 | 3.0 | 3.0 |
| Maximun tensile strength (Mpa) | Intial state | 20.0 | 21.3 | 20.2 | 19.9 | 18.4 | 16.9 | 21.9 | 19.6 | 18.5 |
|  | Heated for 100 hours | 24.4 | 25.1 | 24.9 | 24.2 | 2.7 | 20.7 | 21.9 | 22.8 | 23.0 |
|  | Heated for 250 hours | 26.4 | 27.0 | 26.5 | 28.0 | 26.8 | 24.5 | 24.2 | 24.5 | 24.6 |
| Tensile elongations at break (%) | Intial state | 170 | 190 | 172 | 158 | 163 | 141 | 175 | 160 | 139 |
|  | Heated for 100 hours | 122 | 144 | 148 | 127 | 129 | 106 | 106 | 140 | 108 |
|  | Heated for 250 hours | 113 | 116 | 121 | 96 | 83 | 73 | 9 | 101 | 74 |
| Color difference ΔE* |  | 3.10 | 2.93 | 2.91 | 3.34 | 3.06 | 3.07 | 2.75 | 3.88 | 8.33 |

[1] ZEST 1000Z (polymerization degree: 1000), produced by ZEST Co., Ltd.
[2] A perchloric acid-treated hydrotalcite obtained by treating DHT-4A produced by Kyowa Chemical Industry Co., Ltd. in a dilute aqueous solution of perchloric acid so that 90 mol % of anion carbonates was substituted with anion perchlorate
[3] A perchloric acid-treated hydrotalcite obtained by treating DHT-4A produced by Kyowa Chemical Industry Co., Ltd. in a dilute aqueous solution of perchloric acid so that 80 mol % of anion carbonates was substituted with anion perchlorate
[4] A perchloric acid-treated hydrotalcite obtained by treating DHT-4A produced by Kyowa Chemical Industry Co., Ltd. in a dilute aqueous solution of perchloric acid so that 60 mol % of anion carbonates was substituted with anion perchlorate
[5] DHT-4A, produced by Kyowa Chemical Industry Co., Ltd.
[6] Produced by Wako Pure Chemical Industries, Ltd.
[7] TRIMEX N-08, produced by Kao Corporation
[8] ADEKA CIZER-O-130S, produced by ADEKA CORPORATION
[9] 4A Powder (sodium A-type zeolite), produced by UNION SHOWA K.K.
[10] Produced by HighChem Co.,Ltd.
[11] JA-805 (tetra (C12 to C15 mixed alkyl) 4,4'-isopropylidene phenyl diphosphite, produced by Johoku Chemical Co., Ltd.
[12] ZEST PQLTX (vinyl chloride resin fine particles, polymerization degree: 800, average particle size: 1 μm), produced by ZEST Co., Ltd.
[13] DA PX-1720 black (A), produced by Dainichiseika Color 85 Chemicals Mfg. Co., Ltd.

In a case where vinyl chloride resin molded articles which had been obtained by subjecting, to powder slush molding, the vinyl chloride resin compositions of Examples 1 to 6 for powder molding were each laminated with and a polyurethane foam molded article, the vinyl chloride resin molded articles each exhibited high maximum tensile strength, high tensile elongations at break at the initial stage and after being heated, and small color difference, and therefore, had a great thermal aging resistance.

In a case where a vinyl chloride resin molded article which had been obtained by subjecting, to powder slush molding, the vinyl chloride resin composition of Comparative Example 1 for powder molding which vinyl chloride resin composition included no perchloric acid-treated hydrotalcite was laminated with a polyurethane foam molded article, the vinyl chloride resin molded article exhibited low tensile elongation at break after being heated for 250 hours. In a case where a vinyl chloride resin molded article which had been obtained by subjecting, to powder slush molding, the vinyl chloride resin composition of Comparative Example 2 for powder molding which vinyl chloride resin composition included no metal salt of fatty acid, the vinyl chloride resin molded article exhibited large color difference. In a case where a vinyl chloride resin molded article which had been obtained by subjecting, to powder slush molding, the vinyl chloride resin composition of Comparative Example 3 for powder molding which vinyl chloride resin composition included an excessively large amount of the perchloric acid-treated hydrotalcite was laminated with a polyurethane foam molded article, the vinyl chloride resin molded article exhibited somewhat low tensile elongations at break after being heated and somewhat large color difference. Therefore, the balance between the tensile elongations at break and color difference was poor. Therefore, in a case where the vinyl chloride resin molded articles which had been obtained by subjecting, to powder slush molding, the vinyl chloride resin compositions of Comparative Examples 1 through 3 for powder molding were laminated with the polyurethane foam molded articles, the vinyl chloride resin molded articles exhibited a low thermal aging resistance.

(Additional Notes)

(Additional Note 1)

A vinyl chloride resin composition for powder molding, including:

100 parts by mass of (a) vinyl chloride resin particles;

0.5 parts by mass to 7 parts by mass of (b) perchloric acid-treated hydrotalcite; and 0.05 parts by mass to 5 parts by mass of (c) metal salt of fatty acid.

(Additional Note 2)

The vinyl chloride resin composition for powder molding as set forth in Additional note 1, further including: 70 parts by mass to 200 parts by mass of (d) plasticizer with respect to 100 parts by mass of (a) the vinyl chloride resin particles.

(Additional Note 3)

The vinyl chloride resin composition for powder molding as set forth in (Additional note 2), wherein (d) the plasticizer is at least one selected from the group consisting of trimellitate plasticizers and epoxidized plant oils.

(Additional Note 4)

The vinyl chloride resin composition for powder molding as set forth in any one of Additional notes 1 through 3, for use in powder slush molding.

(Additional Note 5)

The vinyl chloride resin composition for powder molding as set forth in any one of Additional notes 1 through 4, (b)

the perchloric acid-treated hydrotalcite contains an anion perchlorate with which an anion carbonate is substituted in a ratio of 50 mol % or more.

(Additional Note 6)

A vinyl chloride resin molded article obtained by subjecting, to powder slush molding, the vinyl chloride resin composition for powder molding as set forth in any one of Additional notes 1 through 5.

(Additional Note 7)

The vinyl chloride resin molded article as set forth in Additional note 6, for use as an automobile instrument panel skin.

(Additional Note 8)

A laminate in which a polyurethane foam molded article and the vinyl chloride resin molded article as set forth in Additional note 6 or 7 are stacked.

(Additional Note 9)

The laminate as set forth in Additional note 8, for use in an automobile instrument panel.

INDUSTRIAL APPLICABILITY

A vinyl chloride resin composition of the present invention for powder molding is suitably molded into skins of automobile interior materials such as an instrument panel and a door trim.

The invention claimed is:

1. A vinyl chloride resin composition for powder molding, comprising:
   100 parts by mass of (a) vinyl chloride resin particles;
   1 part by mass to 3.5 parts by mass of (b) perchloric acid-treated hydrotalcite wherein an anion carbonate in an untreated hydrotalcite is substituted with an anion perchlorate in said perchloric acid-treated hydrotalcite in a ratio of 85 mol % or more and 95 mol % or less;
   0.05 parts by mass to 5 parts by mass of (c) fatty acid zinc salt; and
   90 parts by mass to 200 parts by mass of (d) plasticizer with respect to 100 parts by mass of (a) the vinyl chloride resin particles,
   wherein
   (d) the plasticizer is a combination of trimellitate plasticizers and epoxidized plant oils,
   a weight ratio of the trimellitate plasticizers and the epoxidized plant oils ranges from 15:1 to 25:1, and
   (d) the plasticizer excludes sebacic acid derivatives.

2. The vinyl chloride resin composition for powder molding as set forth in claim 1, for use in powder slush molding.

3. A vinyl chloride resin molded article obtained by subjecting, to powder slush molding, the vinyl chloride resin composition for powder molding as set forth in claim 1.

4. The vinyl chloride resin molded article as set forth in claim 3, for use as an automobile instrument panel skin.

5. A laminate in which a polyurethane foam molded article and the vinyl chloride resin molded article as set forth in claim 3 are stacked.

6. The laminate as set forth in claim 5, for use in an automobile instrument panel.

* * * * *